E. R. WOLCOTT.
METHOD OF COLLECTING SUSPENDED MATERIAL FROM FURNACE GASES.
APPLICATION FILED APR. 29, 1918.
1,329,818.
Patented Feb. 3, 1920.
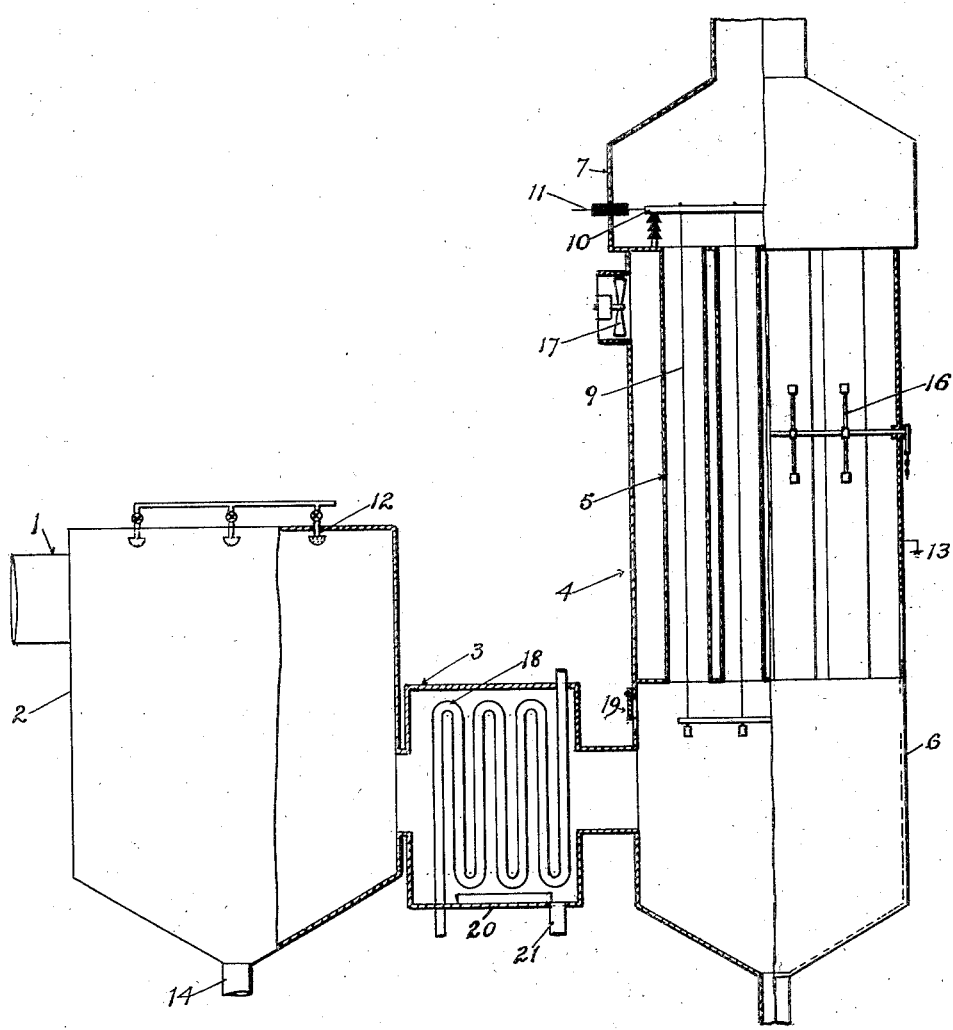
Inventor:
Edson R. Wolcott
by Arthur P. Knight
Attorney

UNITED STATES PATENT OFFICE.

EDSON R. WOLCOTT, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

METHOD OF COLLECTING SUSPENDED MATERIAL FROM FURNACE-GASES.

1,329,818. Specification of Letters Patent. Patented Feb. 3, 1920.

Application filed April 29, 1918. Serial No. 231,453.

*To all whom it may concern:*

Be it known that I, EDSON R. WOLCOTT, a citizen of the United States, residing at Los Angeles, in the county of Los Angeles and State of California, have invented a new and useful Method of Collecting Suspended Material from Furnace-Gases, of which the following is a specification.

This invention relates to the collection of dust and fumes from gases passing from smelters, kilns or other furnaces, and is especially applicable in cases where the gases being treated for collection of dust and fume are at high temperature and the fume is difficult of collection on account of its fineness. In such cases, electrical precipitation has been found to be the most practicable method of collection, but in some cases this method of collection is not wholly satisfactory on account of the collected material being of such a nature as to interfere with successful precipitation; for example, in the case of material of a non-conducting nature, there is a tendency to lower the voltage that can be maintained in the precipitator without arcing between the electrodes of the apparatus—and thereby prevent efficient operation of the precipitator.

In order to overcome the difficulties above referred to and attain certain other advantages in operation, I pass the gases in contact with water or solution preferably in such manner as to approximately saturate the gases with water vapor. This operation may be performed in any suitable manner, for example by spraying water or solution into the gases, the effect being to evaporate some of the water, and to correspondingly lower the temperature of the gases, and there may also be more or less removal of dust or suspended material from the gases in this operation. The gases so humidified are passed to an electrical precipitator wherein they are subjected to electrical action to precipitate the fume or fine particles therefrom, and the temperature of the gases being reduced sufficiently to cause condensation of some of the water vapor. The amount of condensation so produced may be varied according to the conditions desired; but is preferably sufficient to form a stream of condensed liquid on the collecting electrodes, in the electrical precipitator, so as to remove or wash away precipitate; in other cases I may provide for only sufficient condensation to make the precipitate or deposit in the precipitator moist enough to present the conductivity required for preventing accumulation of electrical charge thereon.

The accompanying drawings illustrate an apparatus suitable for carrying out my invention, said drawing being a vertical section of such an apparatus.

In the drawing, a flue for conducting hot gases from a furnace is indicated at 1, said flue leading to a chamber 2, which serves as a humidifying chamber. The outlet flue 3 of chamber 2 communicates with an electrical precipitator 4, which may be of any suitable type, the precipitator or treater being herein shown as comprising a plurality of vertical pipes 5 connected at their lower and upper ends respectively to a lower header 6, connected to flue 3, and an upper header 7 connected to stack 8. The pipes 5 constitute collecting electrodes. The discharge electrodes of the electrical precipitator may consist of wires 9 hung from an insulated support 10, which is connected by wire 11 to any suitable means for supplying high tension unidirectional current, the collecting electrodes being grounded as indicated at 13, to complete the connection.

The humidifying chamber 2 is provided with suitable water supply means, for example, with spray nozzles 12 for distributing, atomizing or spraying water or solution into said chamber so as to humidify the gases and preferably to saturate the gases with water vapor. The amount of water supplied in this chamber may be just enough to fully or approximately saturate the gases with water vapor, so that all of the suspended material moves on with the gases except those particles which are sufficiently heavy to settle out by gravity, or if desired, an excess of water may be supplied to the chamber 2, and in that case the water may also serve to wash the gases and the excess of water together with collected material may pass to the bottom of chamber 2 whence it may be drawn through suitable outlet means 14.

In passing to or through the electrical precipitator the gases so humidified are cooled sufficiently to cause condensation of more or less of the water vapor therein, such water being condensed partly in the walls of the various passages and partly in the form of fog or cloud, the suspended particles in the gases acting as centers of condensation, so that a considerable portion of the water may be condensed directly on such suspended particles. The ions produced by the action of the electrical discharge in the electrical precipitator, also act as centers of condensation and facilitate the formation of a fog or cloud—and the action of the electrical field in said precipitator serves to precipitate on the collecting electrodes not only the suspended particles of solid material but also the particles of water vapor present, so that the deposit collected on the collecting electrodes may be caused to contain sufficient water to render it conducting and to continuously carry off electricity received thereby. By this means I avoid accumulation of electrical charges on the deposit and resulting interference with the operation of the treater by reason of lowering of arcing voltage resulting from local charges on the deposited material. In general the walls of the electrical precipitator will be considerably cooler than the gases passing through the precipitator pipe or flues, and in some cases the process may be so carried out that little if any condensation to fog or cloud takes place in the gases, but the walls are maintained sufficiently cool to cause condensation of moisture in the deposit in contact with the walls, and in such cases, the walls may be cooled, by radiation or by circulation of external air, (assisted if necessary by blower means 17) or by other suitable cooling means, if necessary. The amount of water condensed in or on the collected material is preferably sufficient to produce a continuous stream or film of liquid on the walls of the treater, whereby the collected material is continually washed away. In any case, the amount of water precipitated or collected in the deposit is preferably sufficient to form a fluid deposit or precipitate which will form a more or less fluid stream on the collecting electrode surfaces, descending by gravity so as to carry away the precipitate. If, in any case, the precipitate is not sufficiently fluid to be wholly carried away by the action of gravity, means, such as suitable hammers 16, may be provided for loosening the deposit from the collecting electrodes, by hammering or otherwise, so that the material will descend on and fall from the collecting electrodes.
In some cases, for example, in the treatment of gases coming from cement kilns using raw mix in place of slurry, the gases will be sufficiently laden with water vapor to enable condensation of moisture to take place on the collecting electrodes in the electrical precipitator, provided the gases are cooled in suitable manner. Such cooling may be effected by cooling means, such as indicated at 18 in the connecting flue 3, leading to the precipitator, and such cooling means may operate as a waste heat economizer or waste heat boiler, if desired. Solid and liquid materials collecting in the flue or chamber 3 may be withdrawn respectively through door 20 and outlet 21. In this case the preliminary chamber 2 may be omitted or it may be used only as a settling chamber for coarse dust, the water supply means being not used in this case. If desired, part or all of the cooling required for reducing the temperature of the gases to the condensation point, may be effected by admitting cold air to the gases, for example, through damper 19, thereby cooling the gases throughout the body thereof, in such manner as to produce a cloud of suspended liquid particles therein, such particles being precipitated along with the solid material. The cooling by the waste heat means 18 or the air admitting means 19 is applicable also in cases where the gases are subjected to preliminary humidifying action, as well as in cases where such preliminary humidification is not necessary. In any case it is essential in carrying out my invention, to maintain the deposit at a temperature of not more than 100 degrees C. when working at approximately atmosphere pressure so that there will be some condensation of water vapor, resulting in a moist precipitate, but the temperature of the gases flowing through the treater may be in excess of 100 degrees C. in case surface condensation on the walls of the treater and the adjacent deposit is depended on for humidification of the deposit.

What I claim is:

1. The process of separating suspended material from hot furnace gases, which consists in injecting water into said gases to humidify and cool, then passing the gases through an electrical field maintained between discharge and collecting electrode surfaces, to precipitate the suspended material on such collecting electrode surfaces, and maintaining such collecting electrode surfaces sufficiently cool to condense water on the material precipitated on the collecting electrode surfaces, the temperature of the gases and of the collecting electrode surfaces being so controlled as to cause sufficient condensation of water with the precipitated material to form a fluid deposit on the collecting electrode surfaces.

2. The process of separating solid suspended non-conductive material from hot furnace gases, which consists in humidifying such gases, cooling the gases to condense water vapor in form of a cloud of suspended particles, and precipitating the particles suspended in the gases, including the solid suspended material and the condensed water as to form a fluid precipitate.

3. In the precipitation of suspended particles from gases, the method of producing a conducting precipitate which consists in subjecting gases containing water and suspended material to cooling action and to the action of an electric field, the cooling action being so controlled relatively to the humidity of the gases as to cause water to be condensed from the gases and to be deposited together with the precipitate in the form of a fluid deposit.

4. In the art of separation of suspended non-conductive material from gases, the step which consists in passing the gases between vertically extending discharge and collecting electrode surfaces between which a high potential difference is maintained so as to maintain an electrical field between said surfaces and controlling the temperature of the gases precedent to and during their passage through said electrical field to cause condensation and precipitation of water from the gases in sufficient amount to form descending fluid streams on the collecting electrode surfaces.

5. The method of removing suspended material, including non-conductive material, from hot furnace gases, which consists in spraying water into the gases to humidify and cool the same and to wash out part of the suspended material, then subjecting the gases to the action of an electric field to precipitate suspended material therefrom, the temperature of the gases being so controlled before and during such precipitation as to cool the gases sufficiently to cause collection of enough water with the precipitated material to form a fluid deposit.

In testimony whereof I have hereunto subscribed my name this 18th day of April, 1918.

EDSON R. WOLCOTT.